US012670420B2

(12) United States Patent
Bae et al.

(10) Patent No.: US 12,670,420 B2
(45) Date of Patent: Jun. 30, 2026

(54) LEARNING CONTENT EVALUATION APPARATUS, SYSTEM, AND OPERATION METHOD FOR EVALUATING PROBLEM BASED ON PREDICTED PROBABILITY OF CORRECT ANSWER FOR PROBLEM CONTENT ADDED WITHOUT SOLVING EXPERIENCE

(71) Applicant: Socra AI Inc., Seoul (KR)

(72) Inventors: Chan Bae, Seoul (KR); Yun Ah Sun, Seoul (KR); June Young Park, Yongin-si (KR)

(73) Assignee: Socra AI Inc., Seoul (KR)

( * ) Notice: Subject to any disclaimer, the term of this patent is extended or adjusted under 35 U.S.C. 154(b) by 1096 days.

(21) Appl. No.: 17/571,960

(22) Filed: Jan. 10, 2022

(65) Prior Publication Data

US 2022/0222553 A1      Jul. 14, 2022

(30) Foreign Application Priority Data

Jan. 11, 2021      (KR) ........................ 10-2021-0003210

(51) Int. Cl.
*G06Q 50/20*      (2012.01)
*G06N 7/01*      (2023.01)
(52) U.S. Cl.
CPC ............... *G06N 7/01* (2023.01); *G06Q 50/20* (2013.01)
(58) Field of Classification Search
CPC ................................. G06N 7/01; G06Q 50/00
See application file for complete search history.

(56) References Cited

U.S. PATENT DOCUMENTS

2020/0193317 A1      6/2020   Cha et al.

FOREIGN PATENT DOCUMENTS

CN      112184089 A  *  1/2021   ........... G06Q 50/205
JP      2020-521244 A      7/2020

OTHER PUBLICATIONS

Benedetto, L., et al, Introducing a Framework to Assess Newly Created Questions with Natural Language Processing, [received Apr. 29, 2025]. Retrieved from Internet:<https://link.springer.com/chapter/10.1007/978-3-030-52237-7_4> (Year: 2020).*

(Continued)

*Primary Examiner* — Miranda M Huang
*Assistant Examiner* — Bart I Rylander
(74) *Attorney, Agent, or Firm* — USX IP LLC

(57)      ABSTRACT

A learning content evaluation apparatus includes a problem information processing unit configured to generate a problem embedding vector on the basis of problem information included in pre-collected problem content; an artificial intelligence (AI) model training unit configured to generate AI learning information including a weight determined using a result of training an AI model on the basis of the problem embedding vector and a user embedding vector, in which solution result data of a user for the pre-collected problem content is reflected; and a correct answer probability prediction unit configured to calculate correct answer probability information about a probability of being answered correctly by the user for the added problem, on the basis of a problem embedding vector of the added problem content and the AI learning information.

6 Claims, 5 Drawing Sheets

(56)                    References Cited

OTHER PUBLICATIONS

Cheng, S., et al, DIRT: Deep Learning Enhanced Item Response Theory for Cognitive Diagnosis, [received Apr. 29, 2025]. Retrieved from Internet:<https://dl.acm.org/doi/abs/10.1145/3357384. 3358070> (Year: 2019).*

Lalor, J., et al, Learning Latent Parameters without Human Response Patterns: Item Response Theory with Artificial Crowds, [received Apr. 29, 2025]. Retrieved from Internet:<https://pmc.ncbi.nlm.nih. gov/articles/PMC6892593/> (Year: 2019).*

Mujtaba, D., et al, Artificial Intelligence in Computerized Adaptive Testing, [received Apr. 29, 2025]. Retrieved from Internet:<https:// ieeexplore.ieee.org/abstract/document/9458219?casa_token= 4vc28BfVQE4AAAAA:o7YcFngHp61TEyl-Hf3cS3SOCfisNMPnuATPOW7dAv2o_ UcD7Rfk306LCzTT7vCYUzeuBfzO> (Year: 2020).*

Uto, M., et al, Automated Short-Answer Grading Using Deep Neural Networks and Item Response Theory, [received Apr. 29, 2025]. Retrieved from Internet:<https://link.springer.com/chapter/ 10.1007/978-3-030-52240-7_61> (Year: 2020).*

Sowmya, J., et al, A Survey on Adaptive Learning Authoring Tools, [received Oct. 20, 2025]. Received from Internet:<https://ieeexplore. ieee.org/abstract/document/8392005> (Year: 2017).*

Song Cheng et al., "DIRT: Deep Learning Enhanced Item Response Theory for Cognitive Diagnosis", CIKM, Nov. 3-7, 2019, China, pp. 2397-2400 (4 pages).

Korean Office Action dated Sep. 26, 2023 in Application No. 10-2022-0074686.

* cited by examiner

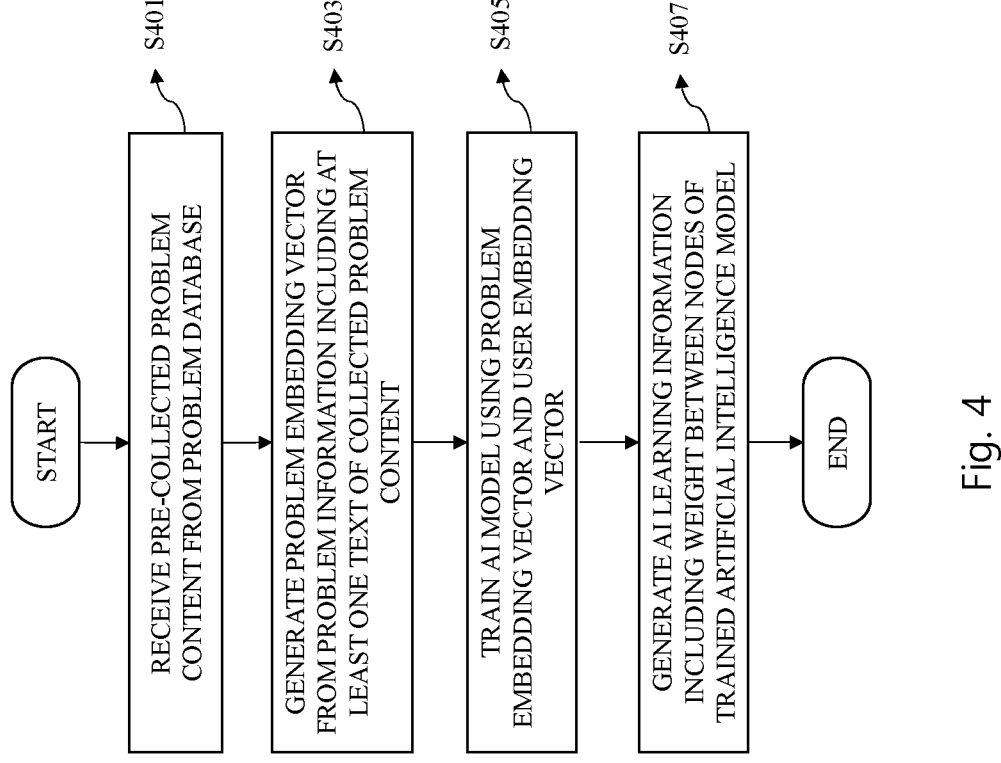

START

RECEIVE PRE-COLLECTED PROBLEM
CONTENT FROM PROBLEM DATABASE    S401

GENERATE PROBLEM EMBEDDING VECTOR
FROM PROBLEM INFORMATION INCLUDING AT
LEAST ONE TEXT OF COLLECTED PROBLEM
CONTENT    S403

TRAIN AI MODEL USING PROBLEM
EMBEDDING VECTOR AND USER EMBEDDING
VECTOR    S405

GENERATE AI LEARNING INFORMATION
INCLUDING WEIGHT BETWEEN NODES OF
TRAINED ARTIFICIAL INTELLIGENCE MODEL    S407

END

Fig. 4

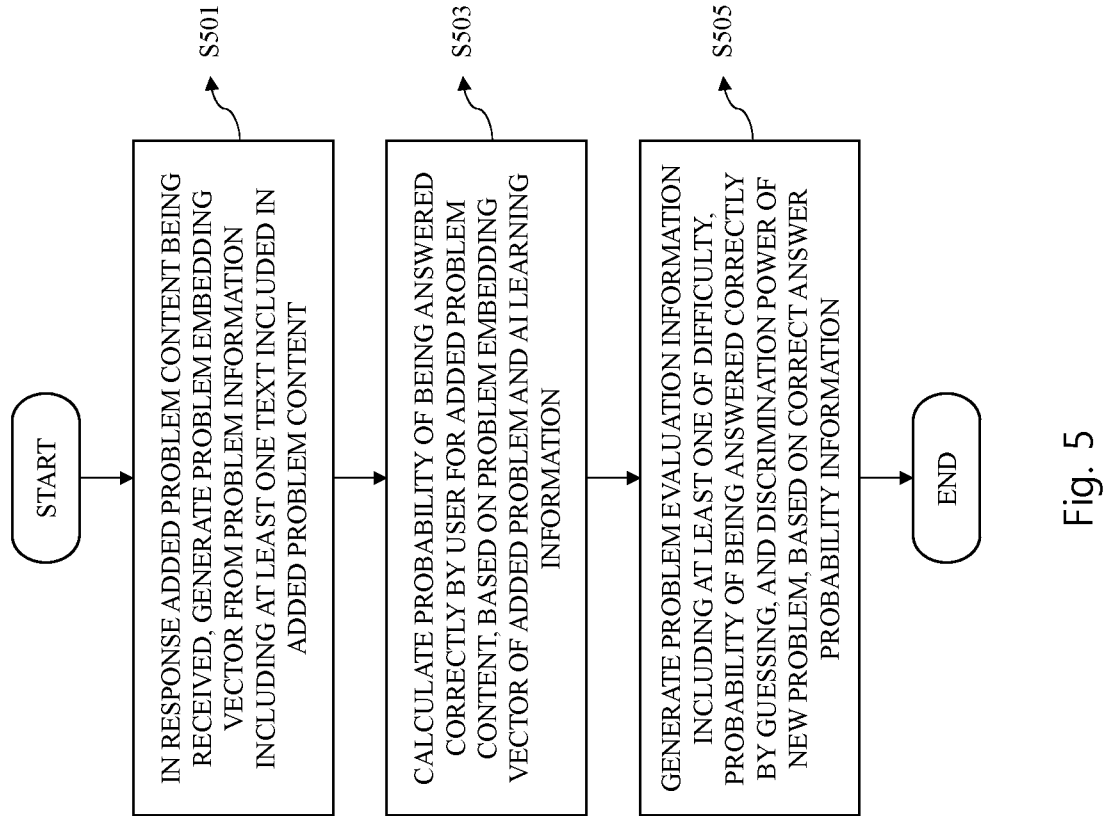

START

IN RESPONSE ADDED PROBLEM CONTENT BEING RECEIVED, GENERATE PROBLEM EMBEDDING VECTOR FROM PROBLEM INFORMATION INCLUDING AT LEAST ONE TEXT INCLUDED IN ADDED PROBLEM CONTENT          S501

CALCULATE PROBABILITY OF BEING ANSWERED CORRECTLY BY USER FOR ADDED PROBLEM CONTENT, BASED ON PROBLEM EMBEDDING VECTOR OF ADDED PROBLEM AND AI LEARNING INFORMATION          S503

GENERATE PROBLEM EVALUATION INFORMATION INCLUDING AT LEAST ONE OF DIFFICULTY, PROBABILITY OF BEING ANSWERED CORRECTLY BY GUESSING, AND DISCRIMINATION POWER OF NEW PROBLEM, BASED ON CORRECT ANSWER PROBABILITY INFORMATION          S505

END

Fig. 5

LEARNING CONTENT EVALUATION APPARATUS, SYSTEM, AND OPERATION METHOD FOR EVALUATING PROBLEM BASED ON PREDICTED PROBABILITY OF CORRECT ANSWER FOR PROBLEM CONTENT ADDED WITHOUT SOLVING EXPERIENCE

CROSS-REFERENCE TO RELATED APPLICATION

This application claims priority to and the benefit of Korean Patent Application No. 10-2021-0003210, filed on Jan. 11, 2021, the disclosure of which is incorporated herein by reference in its entirety.

BACKGROUND

1. Field

The present invention relates to a learning content evaluation apparatus, system, and operation method for evaluating the quality of an added problem on the basis of a predicted probability of a correct answer for the problem added without solving experience.

Embodiments of the present invention relate to apparatus, system, and operation method for training an artificial intelligence (AI) model only with an embedding vector of a problem in which a solution result is not reflected, predicting the probability of a correct answer for an added problem on the basis of the trained AI model, and evaluating qualities of the added problem, such as the difficulty, the probability of being answered correctly by guessing, the discriminatory power, etc. of the added problem through the predicted probability of a correct answer.

2. Discussion of Related Art

Recently, the Internet and electronic devices have been actively used in each field, and the educational environment is also changing rapidly. In particular, with the development of various educational media, learners may choose and use a wider range of learning methods. Among the learning methods, education services through the Internet have become a major teaching and learning method by overcoming time and space constraints and enabling low-cost education.

To keep up with the trend, customized education services, which are not available in offline education due to limited human and material resources, are also diversifying. For example, artificial intelligence (AI) is used to provide educational content that is subdivided according to the individuality and ability of a learner so that the educational content is provided according to the individual competency of the learner, which departs from standardized education methods of the past.

In the field of learning, item response theory (IRT) is used to test the quality of problems. The IRT is a model that focuses on each problem constituting a test, and uses a unique item characteristic curve for each problem to estimate the potential characteristics or abilities of the user and the characteristics of the problem.

The item characteristic curve, which is a key element of the IRT, represents a functional relationship between the user's potential characteristics or abilities and the probability of answering the item correctly. With such a functional relationship, the quality and characteristics of a given problem may be predicted on the basis of the probability that a user answers the problem correctly.

In the conventional technology, when a new problem is generated, in order to identify the characteristics of the problem through IRT, thousands of students need to solve the problem. For example, under the widely used 3-parameter logistic IRT, in order to identify the characteristics of a problem with high reliability, more than 7,500 students need to solve the problem, and thus efficiency is lowered.

SUMMARY

The present invention is directed to providing a learning content evaluation apparatus, system, and operation method capable of predicting the probability of a correct answer without users actually solving problems, by utilizing an artificial intelligence (AI) model trained with a problem embedding vector in which a solution result is not reflected, for predicting the probability of a correct answer of added problem content.

In addition, the present invention is directed to providing a learning content evaluation apparatus, system, and operation method capable of evaluating qualities of an added problem, such as the difficulty, the probability of being answered correctly by guessing, and the discrimination power of the added problem through item response theory (IRT) without users actually solving problems.

The technical objectives of the present invention are not limited to the above, and other objectives may become apparent to those of ordinary skill in the art based on the following descriptions.

According to an aspect of the present invention, there is provided a learning content evaluation apparatus for evaluating a problem on the basis of a probability of a correct answer of a user for content of an added problem, the learning content evaluation apparatus including: a problem information processing unit configured to generate a problem embedding vector on the basis of problem information included in pre-collected problem content; an artificial intelligence (AI) model training unit configured to generate AI learning information including a weight determined using a result of training an AI model on the basis of the problem embedding vector and a user embedding vector, in which solution result data of a user for the pre-collected problem content is reflected; and a correct answer probability prediction unit configured to calculate correct answer probability information about a probability of being answered correctly by the user for the added problem, on the basis of a problem embedding vector of the added problem content and the AI learning information.

According to an aspect of the present invention, there is provided an operation method of a learning content evaluation apparatus for evaluating a problem on the basis of a probability of a correct answer of a user for content of an added problem, the operation method including: generating a problem embedding vector on the basis of problem information included in pre-collected problem content; generating artificial intelligence (AI) learning information including a weight determined using a result of training an AI model on the basis of the problem embedding vector and a user embedding vector, in which solution result data of a user for the pre-collected problem content is reflected; and calculating correct answer probability information about a probability of being answered correctly by the user for the added problem on the basis of a problem embedding vector of the added problem content and the AI learning information.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 4 is a flowchart for describing an operation method of a learning content evaluation apparatus in a learning operation according to an embodiment of the present invention; and FIG. 5 is a flowchart for describing an operation method of a learning content evaluation apparatus in a prediction operation and an evaluation operation according to an embodiment of the present invention.

DETAILED DESCRIPTION OF EXEMPLARY EMBODIMENTS

Figure 1:
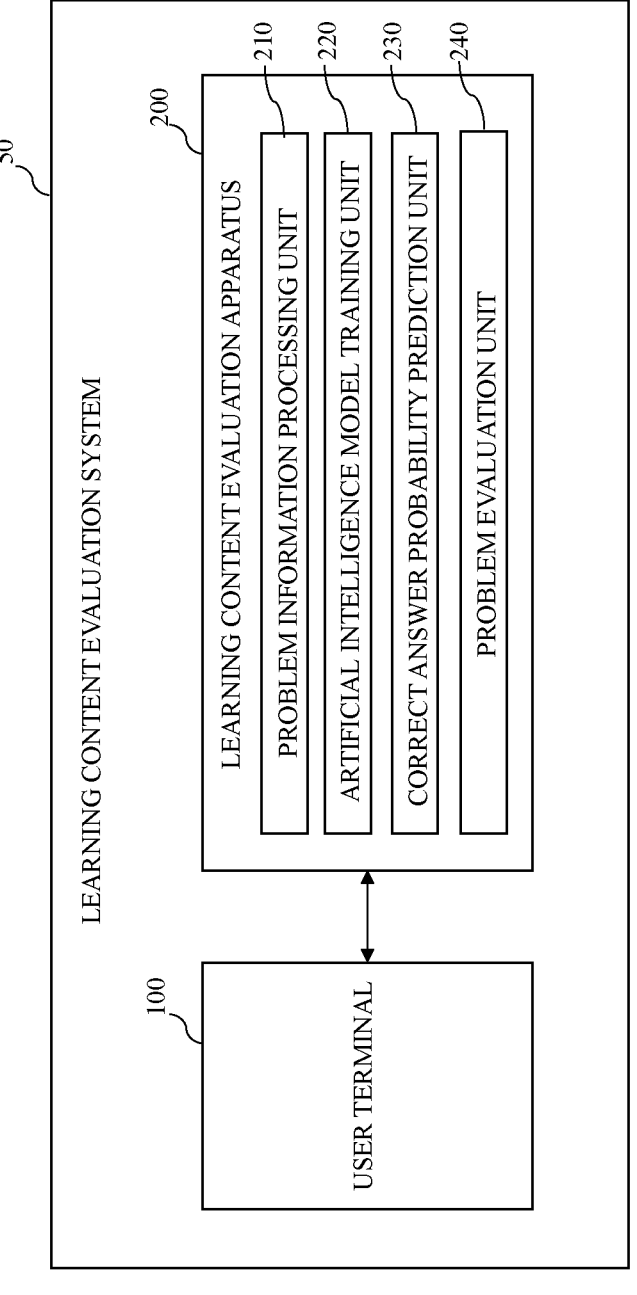
FIG. 1 is a view for describing a learning content evaluation system according to an embodiment of the present invention.

Hereinafter, embodiments of the present invention will be described in detail with reference to the accompanying drawings. In the drawings, the same parts throughout the drawings will be assigned the same number, and redundant descriptions thereof will be omitted.

It should be understood that, when an element is referred to as being "connected to" or "coupled to" another element, the element can be directly connected or coupled to another element, or an intervening element may be present. Conversely, when an element is referred to as being "directly connected to" or "directly coupled to" another element, there are no intervening elements present.

In the description of the embodiments, the detailed description of related known functions or constructions will be omitted herein to avoid making the subject matter of the present invention unclear. In addition, the accompanying drawings are used to aid in the explanation and understanding of the present invention and are not intended to limit the scope and spirit of the present invention and cover all modifications, equivalents, and alternatives falling within the spirit and scope of the present invention.

Specific embodiments are shown by way of example in the specification and the drawing and are merely intended to aid in the explanation and understanding of the technical spirit of the present invention rather than limiting the scope of the present invention. Those of ordinary skill in the technical field to which the present invention pertains should be able to understand that various modifications and alterations may be made without departing from the technical spirit or essential features of the present invention.

FIG. 1 is a view for describing a learning content evaluation system according to an embodiment of the present invention.

Referring to FIG. 1, a learning content evaluation system 50 may include a user terminal 100 and a learning content evaluation apparatus 200.

The learning content evaluation apparatus 200 may communicate with the user terminal 100 and receive a problem solution result from the user. In addition, the learning content evaluation apparatus 200 may evaluate the quality of added problem content without having solution result data through an artificial intelligence (AI) model trained from pre-collected pieces of problem content and provide the evaluated quality of the added problem content to the user terminal 100.

In the conventional technology, when new problem content is generated, thousands of students need to solve the problem to identify the characteristics of the problem. According to the method, numerous pieces of solution result data of new problem content is learned by an AI model, and the probability of being answered correctly by a user who has not solved the problem is predicted.

However, there is a great difficulty in having thousands of students solve numerous problems that are updated regularly. In addition, since the method provides arbitrary users with new problem content for which the characteristics and quality of problems have not yet been analyzed, there is a problem of low learning efficiency.

Accordingly, the learning content evaluation apparatus 200 according to the embodiment of the present invention may predict the probability of a correct answer for an added problem, using an AI model trained with a problem embedding vector and a user embedding vector.

Specifically, the learning content evaluation apparatus 200 simulates a virtual situation in which a plurality of users solve an added problem using an AI model, to predict the probability of being answered correctly by users without the users actually solving the problem.

The operation of the learning content evaluation apparatus 200 may be largely divided into 1) a learning operation, 2) a prediction operation, and 3) an evaluation operation.

The learning operation may be an operation in which an AI model trains an artificial neural network on the basis of a problem embedding vector and a user embedding vector. The prediction operation may be an operation of predicting the probability of being answered correctly by users for added problem content on the basis of the trained artificial neural network. The evaluation operation may be an operation of generating problem evaluation information from the predicted probability of a correct answer using item response theory (IRT).

Hereinafter, the learning operation will be described with reference to FIGS. 2 and 4 and the prediction operation and the evaluation operation will be described with reference to FIGS. 3 and 5 in order.

Figure 2:
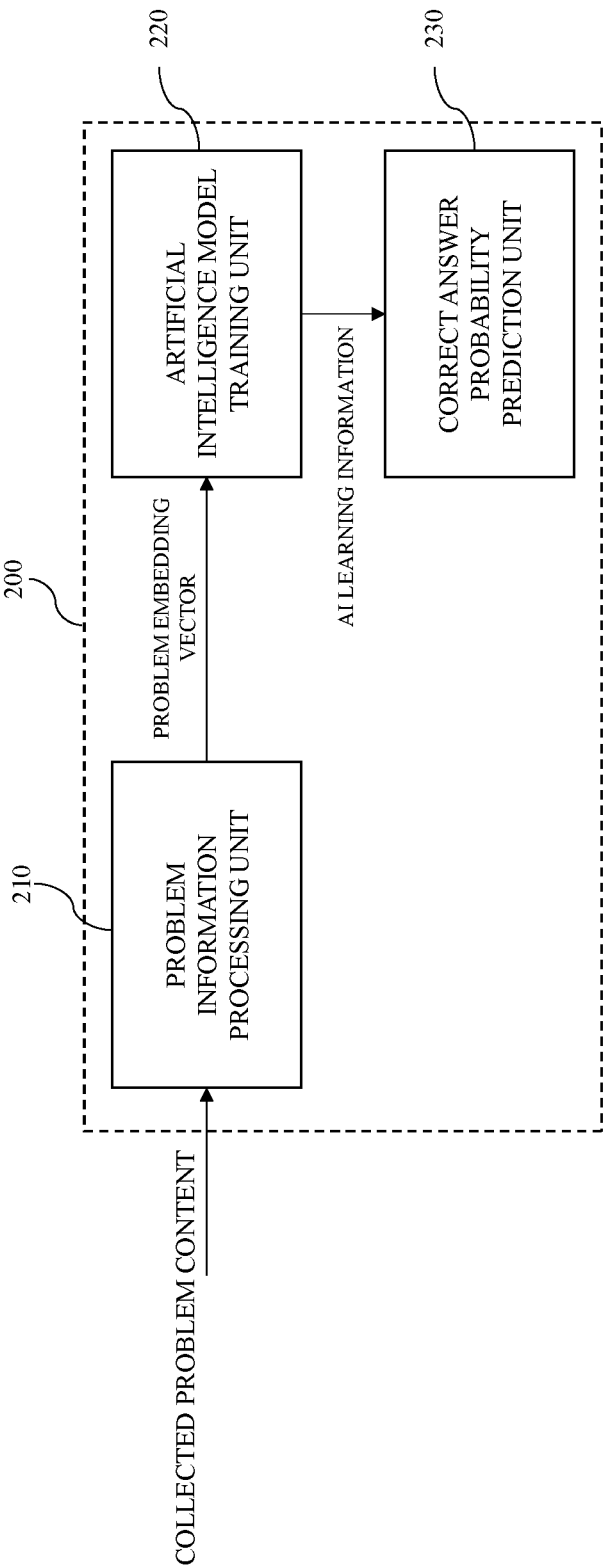
FIG. 2 is a block diagram for describing in detail an operation of a learning content evaluation apparatus in a learning operation according to an embodiment of the present invention.

FIG. 2 is a block diagram for describing in detail an operation of a learning content evaluation apparatus 200 in a learning operation according to an embodiment of the present invention.

The learning content evaluation apparatus 200 may include a problem information processing unit 210, an AI model training unit 220, and a correct answer probability prediction unit 230. Although not shown in the drawing, the learning content evaluation apparatus 200 may further include a problem evaluation unit 240. The operation of the problem evaluation unit 240 will be described in detail in the description of FIG. 3 below.

The learning content evaluation apparatus 200 may include: a problem information processing unit 210 configured to generate a problem embedding vector on the basis of problem information included in pre-collected problem content; an AI model training unit 220 configured to generate AI learning information including a weight determined using a result of training an AI model, on the basis of the problem embedding vector and a user embedding vector, in which solution result data of a user for the pre-collected problem content is reflected; and a correct answer probability prediction unit 230 configured to calculate correct answer probability information about a probability of being answered correctly by a user for an added problem, on the basis of a problem embedding vector of added problem content and the AI learning information.

The problem information processing unit 210 may generate a problem embedding vector on the basis of problem information, such as text or tags, included in problem content. The problem is embedded and input so as to be graspable by an artificial neural network.

In an embodiment of the present invention, the problem embedding vector may be generated using only the problem information without solution result data of a user. The solution result data may be information including a user's response to the solved problem.

The existing AI model is trained on the basis of a problem embedding vector and a user embedding vector in which a user's solution result is reflected. Then, on the basis of the trained AI model, the probability of being answered correctly for an unsolved problem is predicted. That is, the existing method requires the user's solution result data to generate the problem embedding vector.

In the present invention, in order to predict the probability of being answered correctly for added problem content that users do not have experience in solving, there is a need to generate a problem embedding vector even without solution result data.

To this end, the problem information processing unit 210 may generate a problem embedding vector on the basis of only the problem information included in the problem content, without reflecting the solution result. The problem information may include various types of information that may represent the problem, such as text (words), tags, lengths of passages, and the average number of characters used in words.

In one embodiment, when text of a problem used in education and evaluation is given, word embedding, such as bidirectional encoder representations from transformers (BERT) embedding, may be used to generate the problem embedding vector in an unsupervised manner. However, this is only one embodiment, and embedding may be performed using various artificial neural network architectures.

The problem embedding vector may be generated using the problem content as an input such that an embedding value (weight) is adjusted to predict the correct answer of the problem.

The AI model training unit 220 may train the AI model on the basis of a problem embedding vector and a user embedding vector. Specifically, the AI model may be trained through the problem embedding vector, in which the solution result data is not reflected, and the user embedding vector, in which the user's solution result data for the problem is reflected.

The problem embedding vector may be information obtained by expressing discrete variables representing problem content into consecutive vectors so as to be grasped by the artificial neural network. The user embedding vector may be information obtained by expressing discrete variables representing user information as consecutive vectors so as to be grasped by the artificial neural network.

As described above, in the embodiment of the present invention, "a problem embedding vector generated only using problem content without solution result data" is used. Accordingly, there is an effect of effectively predicting the probability of being answered correctly for "an embedding vector for added problem content without solution result data."

In another embodiment, the AI model training unit 220 may perform training by allowing an AI model trained according to the conventional method to additionally learn a problem embedding vector in which solution result data is not reflected.

In conventional learning, an AI model is trained with a problem embedding vector and a user embedding vector in which solution result data is reflected. The AI model trained as described above is referred to as an initial AI model.

The AI model training unit 220 may allow the initial AI model to additionally learn a problem embedding vector, which is generated only using problem information without solution result data.

The trained AI model knows the prediction result of the problem embedding vector generated only using problem information, and thus may predict the probability of a correct answer even for added problem content without having solution result data later.

When the AI model training unit 220 completes the training of the AI model, AI learning information may be generated. The AI learning information may include information about a weight indicating the strength of a connection between nodes.

The weight may be adjusted by repeatedly comparing a predicted value with an actual result to reduce an error. The artificial neural network model trained as described above may be used to predict the probability of a correct answer in the prediction operation.

Figure 3:
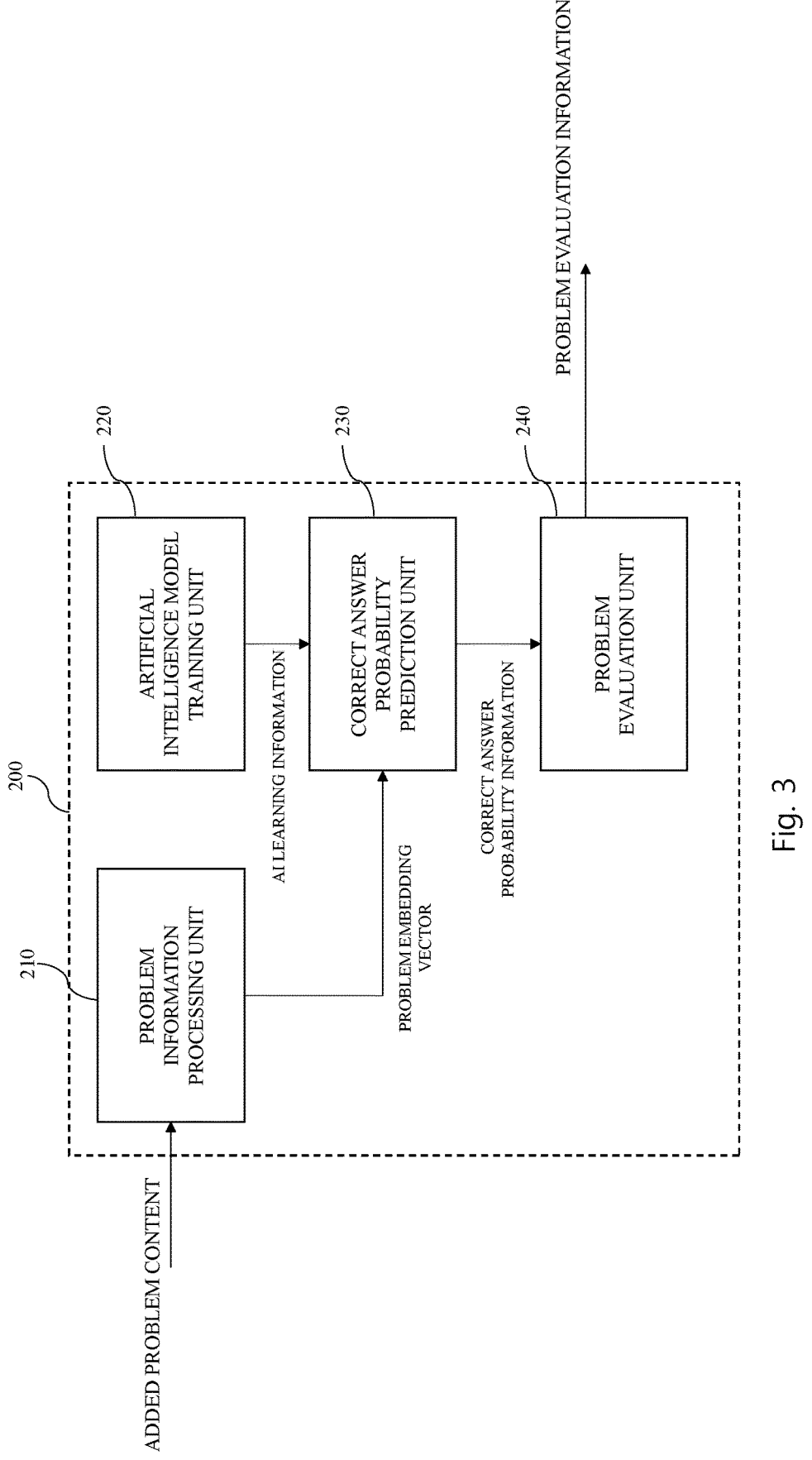
FIG. 3 is a block diagram for describing in detail an operation of a learning content evaluation apparatus in a prediction operation and an evaluation operation according to an embodiment of the present invention.

FIG. 3 is a block diagram for describing in detail an operation of a learning content evaluation apparatus in a prediction operation and an evaluation operation according to an embodiment of the present invention.

Referring to FIG. 3, the learning content evaluation apparatus 200 may include the problem information processing unit 210, the AI model training unit 220, the correct answer probability prediction unit 230, and the problem evaluation unit 240.

The problem information processing unit 210, in response to added problem content being received, may generate a problem embedding vector for the added problem content.

The problem information processing unit 210 may generate the problem embedding vector on the basis of problem information, such as text or tags, included in the problem content. In an embodiment of the present invention, the problem embedding vector may be generated using only problem information without the user's solution result data. The operation of the problem information processing unit 210 has been described above with reference to FIG. 2, and the same description will be omitted below.

The correct answer probability prediction unit 230 may calculate the probability of being answered correctly by a user for the added problem content on the basis of the AI learning information and the problem embedding vector. For calculating the probability of a correct answer, one or more of various artificial neural network models that may be implemented by programs, such as a recurrent neural network (RNN), a long/short-term memory (LSTM), a bidirectional LSTM, a transformer structure-artificial neural network, and BERT.

According to an embodiment, the correct answer probability prediction unit 230 may predict a test score or grade to be given to the user after solving a problem in addition to the probability of a correct answer. The predicted value may reflect the solution result to be updated whenever the user solves one or more problems.

The probability of a correct answer predicted by the correct answer probability prediction unit 230 may be used to evaluate the characteristics and quality of the problem. The problem evaluation unit 240 may generate problem evaluation information including at least one of the difficulty, the probability of being answered correctly by guessing, and the discrimination power of the problem, on the basis of the correct answer probability information.

However, this is only an example, and the problem evaluation information may include various types of information that may represent the characteristics of the problem, the ability or potential characteristics (solving speed, concentration, etc.) of the user in the relationship between the quality of the problem itself and the user.

The problem evaluation unit 240 may use IRT to generate the problem evaluation information. The IRT may represent, in relation to a problem solved, a functional relationship between the potential characteristics or the abilities of the user and the probability of being answered correctly for the problem.

Through the functional relationship, the probability of a correct answer or the score of the problem may be predicted by the potential characteristic or the ability of the user, and conversely, when the probability of a correct answer or the score of the problem is known, the potential characteristic or the ability of the user may be predicted.

The learning content evaluation apparatus, system, and operation method according to an embodiment of the present invention provide an effect of predicting the probability of a correct answer without users actually solving the problem, by utilizing an AI model trained with a problem embedding vector in which a solution result is not reflected, for predicting the probability of a correct answer of added problem content.

In addition, the learning content evaluation apparatus, system, and operation method according to an embodiment of the present invention provide an effect of evaluating qualities of an added problem, such as the difficulty, the probability of being answered correctly by guessing, and the discrimination power of the added problem, without users actually solving the problem.

FIG. 4 is a flowchart for describing an operation method of a learning content evaluation apparatus in a learning operation according to an embodiment of the present invention.

Referring to FIG. 4, in operation S401, the learning content evaluation system may receive pre-collected problem content from a problem database. The problem content may include various types of problem information that may represent the problem, such as text (words), tags, lengths of passages, and the average number of characters used in words.

In operation S403, the learning content evaluation system may generate a problem embedding vector from the problem information including at least one text of the collected problem content.

When text of a problem used in education and evaluation is given, word embedding, such as BERT embedding, may be used to generate the problem embedding vector in an unsupervised manner. However, this is only one embodiment, and embedding may be performed using various artificial neural network architectures.

In an embodiment of the present invention, the problem embedding vector may be generated only with the problem information without the user's solution result data. Such a configuration has an effect of effectively predicting the probability of being answered correctly even for a newly added problem that does not have a solution result.

In operation S405, the learning content evaluation system may perform training on an AI model using a problem embedding vector and a user embedding vector. In another embodiment, the learning content evaluation system may perform training by allowing an AI model trained according the conventional method to additionally learn problem content.

In operation S407, the learning content evaluation system may generate AI learning information including a weight between nodes of the trained AI model.

The AI learning information may include a weight indicating the strength of a connection between nodes. The weight may be adjusted by repeatedly comparing a predicted value with an actual result to reduce an error. The artificial neural network model trained as described above may be used to predict the probability of a correct answer in the prediction operation.

FIG. 5 is a flowchart for describing an operation method of a learning content evaluation apparatus in a prediction operation and an evaluation operation according to an embodiment of the present invention.

In operation S501, the learning content evaluation system, in response to added problem content being received, may generate a problem embedding vector for the added problem content from problem information including at least one text of the added problem.

Since the generating of the embedding vector of the newly added problem is the same as that in operation S403 of FIG. 4, detailed descriptions thereof will be omitted.

In operation S503, the learning content evaluation system may calculate the probability of being answered correctly by a user for the added problem, on the basis of the problem embedding vector of the added problem and the AI learning information.

Thereafter, in operation S505, the learning content evaluation system may generate problem evaluation information including at least one of the difficulty, the probability of being answered correctly by guessing, and the discrimination power of the added problem, on the basis of the correct answer probability information.

As is apparent from the above, the learning content evaluation apparatus, system, and operation method according to an embodiment of the present invention can predict the probability of a correct answer without users actually solving problem, by utilizing an artificial intelligence (AI) model trained with a problem embedding vector in which a solution result is not reflected, for predicting the probability of a correct answer of added problem content.

The learning content evaluation apparatus, system, and operation method according to an embodiment of the present invention can evaluate qualities of an added problem, such as the difficulty, the probability of being answered correctly by guessing, and the discrimination power of the added problem through item response theory (IRT) without users actually solving the problem.

Specific embodiments are shown by way of example in the specification and the drawing and are merely intended to aid in the explanation and understanding of the technical spirit of the present invention rather than limiting the scope of the present invention. Those of ordinary skill in the technical field to which the present invention pertains should be able to understand that various modifications and alterations may be made without departing from the technical spirit or essential features of the present invention.

What is claimed is:

1. A learning content evaluation apparatus for evaluating characteristics of a problem on the basis of a probability of a correct answer of a user for content of the problem, the learning content evaluation apparatus comprising:

a processor; and a memory storing instructions executable by the processor, wherein the processor is configured to:

generate a problem embedding vector of pre-collected problem content by using bidirectional encoder representations from transformers (BERT) embedding in an unsupervised manner on the basis of only problem information included in the pre-collected problem content without using solution result data of the problem information, train an AI model on the basis of (i) the problem embedding vector in which the solution result data of the problem information is not reflected and (ii) a user embedding vector in which solution result data of users for the pre-collected problem content is reflected, generate AI learning information including a weight determined using a result of training the AI model, generate a problem embedding vector of an added problem not solved by any of the users by using only problem information of the added problem without using solution result data of the added problem, calculate correct answer probability information about a probability of being answered correctly by the user for the added problem not solved by any of the users by an artificial neural network model implemented by a program that is one of a recurrent neural network (RNN), a long/short-term memory (LSTM), a bidirectional LSTM, a transformer structure-artificial neural network, and BERT on the basis of the problem embedding vector of the added problem not solved by any of the users and the AI learning information, wherein the calculating of the correct answer probability information comprises calculating the correct answer probability information by inputting the problem embedding vector of the added problem not solved by any of the users into the artificial neural network model, on the basis of the correct answer probability information of the added problem, generate problem evaluation information of the added problem not solved by any of the users, the problem evaluation information including one or more of a difficulty, a probability of being answered correctly by guessing and a discrimination power of the added problem, and provide the generated problem evaluation information to a user terminal of the user.

2. The learning content evaluation apparatus of claim 1, wherein the processor is further configured to generate the problem embedding vector of the pre-collected problem content using a word embedding when text of a problem used for education or evaluation is given, and the problem embedding vector of the pre-collected problem content is generated using the pre-collected problem content as an input such that an embedding value is adjusted to predict a correct answer of the pre-collected problem content.

3. The learning content evaluation apparatus of claim 2, wherein the processor is further configured to perform training to allow the AI model, which is trained with the problem embedding vector generated using the solution result data and the user embedding vector including a response of the user to additionally learn the added problem.

4. The learning content evaluation apparatus of claim 3, wherein the processor is further configured to predict a test score or grade to be given to the user after solving a problem in addition to the probability of a correct answer, and the test score or grade reflects a result of solving one or more problems to be updated whenever the user solves the one or more problems.

5. The learning content evaluation apparatus of claim 1, wherein the processor is further configured to generate the problem evaluation information using an item response theory (IRT) representing a functional relationship between characteristics of the added problem and the probability of being answered correctly for the added problem.

6. An operation method of a learning content evaluation apparatus for evaluating characteristics of a problem on the basis of a probability of a correct answer of a user for content of the problem, the operation method comprising:

generating a problem embedding vector of pre-collected problem content by using bidirectional encoder representations from transformers (BERT) embedding in an unsupervised manner on the basis of only problem information included in the pre-collected problem content without using solution result data of the problem information;

training an AI model on the basis of (i) the problem embedding vector in which the solution result data of the problem information is not reflected and (ii) a user embedding vector in which solution result data of users for the pre-collected problem content is reflected;

generating artificial intelligence (AI) learning information including a weight determined using a result of training the AI model;

generating a problem embedding vector of an added problem not solved by any of the users by using only problem information of the added problem without using solution result data of the added problem;

calculating correct answer probability information about a probability of being answered correctly by the user for the added problem not solved by any of the users by using an artificial neural network model implemented by a program that is one of a recurrent neural network (RNN), a long/short-term memory (LSTM), a bidirectional LSTM, a transformer structure-artificial neural network, and BERT on the basis of the problem embedding vector of the added problem and the AI learning information, wherein the calculating of the correct answer probability information comprises calculating the correct answer probability information by inputting the problem embedding vector of the added problem not solved by any of the users into the artificial neural network model;

on the basis of the correct answer probability information of the added problem, generating problem evaluation information of the added problem not solved by any of the users, the problem evaluation information including one or more of a difficulty, a probability of being answered correctly by guessing and a discrimination power of the added problem; and providing the generated problem evaluation information to a user terminal of the user.

* * * * *